United States Patent [19]

Cerny et al.

[11] 4,130,140

[45] Dec. 19, 1978

[54] HEAT INSULATED CONDUIT ESPECIALLY SUITABLE FOR CARRYING HIGH TEMPERATURE FLUIDS

[75] Inventors: Ronald N. Cerny, Littleton; Walter B. Peters, Englewood; Thomas H. Sadler, Morrison; Peter Rodrigo; George M. Mollick, both of Littleton, all of Colo.

[73] Assignee: Johns-Manville Corporation, Denver, Colo.

[21] Appl. No.: 730,775

[22] Filed: Oct. 8, 1976

[51] Int. Cl.² ............................................. F16L 9/14
[52] U.S. Cl. ................................. 138/149; 138/103; 138/178
[58] Field of Search ...................... 138/103, 149, 178; 220/209; 137/854; 61/13

[56] References Cited

U.S. PATENT DOCUMENTS

| 735,449 | 8/1903 | Berger | 138/149 X |
|---|---|---|---|
| 1,112,622 | 10/1914 | Jones | 220/251 X |
| 2,610,028 | 9/1952 | Smith | 138/178 X |
| 2,930,407 | 3/1960 | Conley et al. | 138/149 X |
| 3,563,572 | 2/1971 | French | 138/149 |
| 3,648,728 | 3/1972 | Perry et al. | 137/854 X |
| 3,802,923 | 4/1974 | Sponar | 220/209 X |
| 4,006,920 | 2/1977 | Sadler et al. | 285/47 X |

Primary Examiner—Richard E. Aegerter
Assistant Examiner—James E. Bryant, III
Attorney, Agent, or Firm—Robert M. Krone; Joseph J. Kelly; Stephen C. Shear

[57] ABSTRACT

A conduit especially suitable for carrying high temperature fluids is disclosed herein and includes an outer casing, a concentric inner core and an intermediate concentric layer of insulation material. The conduit also includes what may be referred to as a pressure relief valve located through the outer casing of the conduit and extending into the concentric layer of insulation material. In the event that the fluid finds its way into this layer of insulation material and in the event it expands, the pressure relief valve provides a readily available passage to the ambient surroundings for the expanding fluid.

6 Claims, 2 Drawing Figures

HEAT INSULATED CONDUIT ESPECIALLY SUITABLE FOR CARRYING HIGH TEMPERATURE FLUIDS

BACKGROUND OF THE INVENTION

The present invention relates generally to a conduit and more particularly to a heat insulated, high temperature fluid carrying conduit in combination with a specific pressure relief valve.

Where conduit service for carrying high temperature fluids, for example extremely hot water or steam, is required, it is often desirable and sometimes necessary to use a heat insulated conduit for this service. A quite satisfactory conduit of this type is disclosed in U.S. Pat. No. 3,563,572, issued to D. W. French on February 16, 1971, and assigned to Johns-Manville Corporation, Assignee of the present application.

The fluid carrying insulated conduit disclosed in the French patent is essentially composed of concentric lengths of pipe consisting of an inner fluid carrying pipe or core, an outer protective pipe or casing spaced concentrically around the inner pipe core and a layer of thermal insulating material positioned concentrically therebetween. Two conduit sections of this type are connected together by means of a composite coupling arrangement including an innermost tubular sealing sleeve or coupling which is positioned concentrically around adjacent end sections of the inner fluid carrying pipes or cores of adjacent conduit sections. An improvement in this overall arrangement is disclosed in United States patent application Ser. No. 557,704, filed Mar. 12, 1975, now U.S. Pat. No. 4,006,920, issued Feb. 8, 1977, to T. H. Sadler and R. N. Cerny and also assigned to Johns-Manville Corporation. As described in this application, this improvement is provided to prevent moisture from finding its way to the layer of insulation material through the coupling.

While the improvement as set forth in this patent has been found to be satisfactory for its intended purpose, moisture could possibly still find its way into the insulation layer. For example, while unlikely, the moisture might be present during initial formation of the conduit. In any case, by whatever means this occurs, if it occurs at all, the present invention, as will be seen hereinafter, is provided for passing this moisture to the ambient surroundings should such moisture be present and should it build in pressure within the insulation layer.

BRIEF SUMMARY OF THE INVENTION

An object of the present invention is to provide a conduit for carrying high temperature fluids under pressure, specifically a conduit (1) which is an improvement over the conduit arrangement disclosed in the aforediscussed French Pat. No. 3,563,572 and (2) which may be used in conjunction with or in lieu of the particular arrangement disclosed in the aforesaid U.S. Pat. No. 4,006,920.

A more specific object of the present invention is to provide a conduit which carries high temperature fluids, particularly a conduit which includes an outer casing, a concentric inner core and a concentric layer of insulation material therebetween, and more particularly one which includes means for passing fluid under pressure within the insulation material to the ambient surroundings directly through the outer casing.

A still more specific object of the present invention is to provide a particularly economical and reliable arrangement for relieving this fluid under pressure.

The conduit to which the present invention is directed is one which includes an outer casing constructed of for example asbestos-cement, a concentric inner core constructed of for example steel, and a concentric layer of insulation material, for example foamed polyurethane, therebetween. In accordance with the present invention this conduit also includes an arrangement, specifically a pressure relief valve, for passing fluid which is within the layer of insulation material and which is under a predetermined amount of pressure to the ambient surroundings of the conduit along a predetermined path directly through the conduit or the casing. This arrangement, or specifically the pressure relief valve, also prevents fluid in the ambient surroundings from passing into the layer of insulation material via the same path.

In an actual working embodiment of the present invention, this arrangement includes a resilient body member located within and extending through an opening provided in and through the conduit's outer casing. This body member itself includes an outwardly extending circumferential fin movable between (1) a first biased position, in the absence of fluid under pressure in the layer of insulation material, for completely closing any path through the opening and (2) a second position, in the presence of such fluid under pressure, for opening a path to the ambient surroundings for the fluid under pressure. This particular arrangement also includes a wing-type toggle bolt for holding the body member in place in the outer casing's opening. The toggle bolt itself includes a longitudinal threaded shaft extending through the resilient body member and having an end section located in the layer of insulation material. A wing element threaded around this end section spans the opening in the outer casing against the under side of the latter and hence prevents the resilient body from moving, particularly from being blown out due to internal pressures.

DETAILED DESCRIPTION

Figure 1:
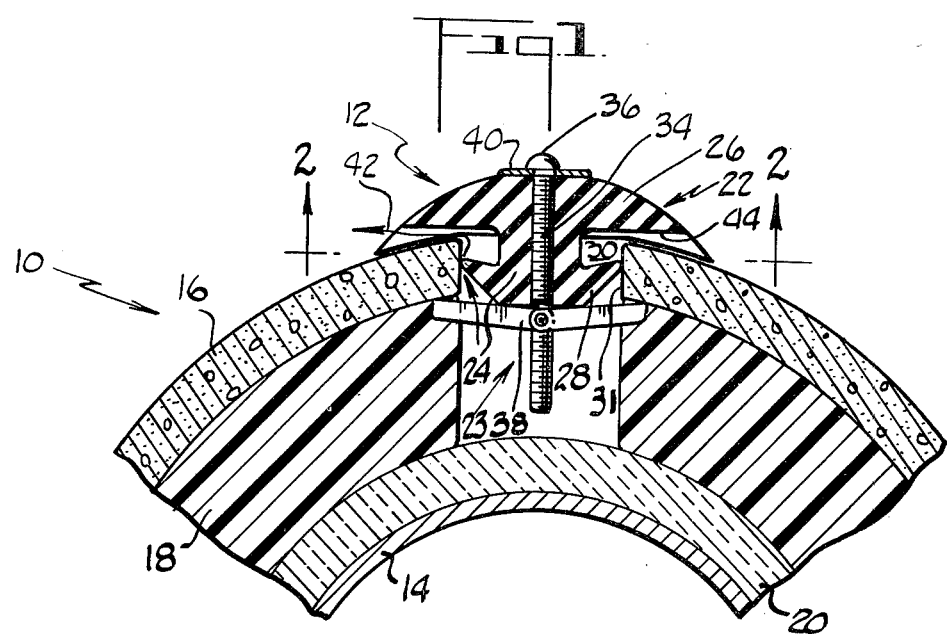
FIG. 1 is a cross-sectional view of a portion of a heat insulated conduit constructed in accordance with the present invention, this figure particularly illustrating a pressure relief valve arrangement comprising part of the conduit.

Turning to the drawing, FIG. 1 illustrates a conduit which is generally designated by the reference numeral 10 and which is adapted to carry high temperature fluids under pressure. Examples of such fluids are steam reaching temperatures of approximately 450° F. and under associated pressures or hot water reaching temperatures of approximately 450° F. and pressures of as much as approximately 500 psi. This conduit includes an arrangement 12 which will be described in detail hereinafter. Apart from this arrangement, the conduit may or may not be identical to the conduit disclosed in previously recited U.S. Pat. No. 4,006,920, and it may or may not comprise part of the particular conduit arrangement disclosed therein.

As illustrated in FIG. 1, conduit 10 includes an innermost fluid carrying pipe or core 14 which may be constructed of, for example, carbon steel and an outermost protective pipe or tubular casing 16 which may be constructed of, for example, asbestos-cement. The core and outer casing are spaced from one another as illustrated in FIG. 1 and a concentric tubular layer of insulation material 18, for example, polyurethane foam, is located therebetween. An additional tubular layer of insulation 20, for example, high temperature lime silicate, can also be provided between core 14 and outer casing 16, for example directly against the outer surface of the core, as seen in FIG. 1.

With the exception of arrangement 12, whether or not conduit 10 is otherwise identical to the conduit disclosed in the previously recited U.S. Pat. No. 4,006,920 and whether or not it forms part of an overall conduit arrangement otherwise identical to the arrangement disclosed in this patent application, it should be clear from FIG. 1 that the conduit includes both an outer casing and a concentric inner core and also a concentric layer of insulation material therebetween. If indeed this conduit is otherwise identical to the conduit in the previously recited patent application, it will of course include a number of other features not illustrated herein. For example, the core 14 will include tubular end sections extending beyond the adjacent ends of outer casing 16 and insulation layer 18, respectively. Moreover, a specific end seal, particularly described in the recited patent application, will be provided on each end section. For a detailed description of these and other features which might be incorporated into conduit 10 reference is made to the previously recited patent application.

Attention is now directed to arrangement 12. As will become apparent hereinafter, this arrangement is provided for passing fluid which might be trapped within layer 18 and which is under a predetermined amount of pressure to the ambient surroundings of the conduit, along a predetermined path directly through outer casing 16. At the same time however, this arrangement prevents fluid in the ambient surroundings from passing into layer 18 along the path just mentioned. To accomplish this, in an actual working embodiment of the present invention, arrangement 12 includes a pressure relief valve 22 and a wing-type toggle bolt 23, both of which will be described in detail below. The relief valve provides the path just recited and the toggle bolt holds the relief valve in place.

The relief valve itself in the working embodiment of the present invention is an integrally formed component constructed of resilient material, specifically EPDM heat resistant rubber. This valve includes a longitudinally extending body 24 including at one end an enlarged head 26 extending radially outwardly therefrom and including at its other end a circumferential fin 28. As illustrated, this fin extends outwardly from body 24 and back towards enlarged head 26 as it tapers to a point. As illustrated, an opening 30 is provided in and entirely through outer casing 16 and, in fact, for reasons to be discussed hereinafter, this opening preferably extends a good distance into or entirely through layer 18. Opening 30 or at least that segment of the opening passing through outer casing 16 is narrower than the outermost extent of fin 28 but it is wider than the outermost extent of main body 24. In this way, the relief valve can be positioned within opening 30 in the manner illustrated in FIG. 1. More specifically, main body 24 is located within opening 30 so that fin 28 along its entire circumference engages the sidewall 31 of casing 16 so as to close opening 30. At the same time, enlarged head 26 spans opening 30 so that an outer circumferential portion of its inner face 32 engages against the outer surface of casing 16 around the opening.

As stated previously, toggle bolt 23 is provided for holding valve 22 in place, specifically in the position just described. This toggle bolt is conventional and hence includes threaded bolt 34 including enlarged head 36 and spring loaded wing element 38. As illustrated, the bolt extends entirely through the longitudinal extent of valve 22, centrally through main body 24, by means of a suitably provided opening. Head 36 rests against the top of enlarged head 26 and a lowermost portion of the bolt extends well into layer 18 in opening 30. A washer 40, where necessary, may be provided between enlarged head 26 and head 36 of bolt 34. Moreover, where necessary or desired a sealing compound, for example silicone, may be utilized around head 36 for sealing the opening in valve 22. In fact, the entire bolt 34 can be coated with the compound for this purpose. Wing element 38 is threaded around the lowermost end section of the bolt and spans opening 30 so as to rest against the underside of casing 16. In this way, relief valve 22 cannot be inadvertently displaced.

Figure 2:
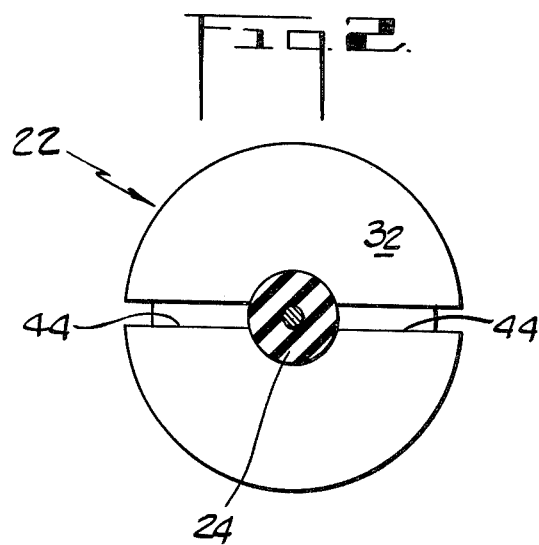
FIG. 2 is a sectional view taken generally along line 2—2 in FIG. 1.

In the event that moisture or any fluid generally manages to find its way into layer of insulation material 18 and in the event that this moisture or fluid generally builds up in pressure due for example to heat, arrangement 12, specifically valve 22, provides a means for escape of this fluid under pressure. More specifically, arrow 42 indicates a path of escape for the fluid under pressure. This path runs between fin 28 and the sidewall 31 of casing 16 defining opening 30 and out to the ambient surroundings of the conduit between inner surface 32 of enlarged head 26 and the outer surface of casing 16. In this regard, it should be pointed out that fin 28 is located within and across opening 30 and prevents fluid under substantially no pressure from passing between it and the sidewalls of casing 16 and hence prevents the passage of fluid into layer 18 from the ambient surroundings. By the same token, the fin is sufficiently resilient to flex out of engagement with the casing against the force of fluid under pressure within layer 18, specifically within opening 30 inwardly of the fins. This in turn allows the fluid under pressure to pass outwardly beyond the fins and finally out into the ambient surroundings between enlarged head 26 and the outer surface of casing 16. A minimum amount of pressure is all that is required to cause fin 28 to flex back out of engagement with casing 16. For example, about 1 to 5 psi pressure in the direction of arrow 42 should be sufficient.

Where toggle bolt 23 is arranged just to hold valve 22 in place but not so surface 32 of enlarged head 26 is held tightly against the outer surface of casing 16, the fluid under pressure can readily pass between the surface and the outer casing. However, in order to insure that a passage is provided between these two components, surface 32 may include one or more slots or recesses 44 which are best illustrated in FIG. 2. As illustrated in this figure, the slots extend entirely across surface 32 and provide a passage for the fluid under pressure, even if the toggle bolt brings enlarged head 26 into a tight fit.

What is claimed is:

1. In a conduit for carrying high temperature fluid under pressure which conduit includes an outer casing, a concentric inner core and a concentric layer of insulation material therebetween, the improvement comprising means for passing moisture, said moisture being within said layer of insulation material and under a predetermined amount of pressure, to the ambient surroundings of said conduit, along a predetermined path directly through said outer casing, said means also preventing fluid in said ambient surroundings from passing into said layer of insulation material along said path, wherein said means includes a body member constructed of a resilient material and located within said outer casing, said body member includes a circumferential fin integral with and extending out from said body member filling said path through said outer casing, said fin movable between a biased first position for maintaining said path closed in the absence of said moisture under pressure in said layer of insulation material and a second position for opening said path to the passage of said fluid in the presence of said moisture under.

2. The improvement according to claim 1 including means for maintaining said body member fixed in said path through said outer casing.

3. The improvement according to claim 2 wherein said last-mentioned means includes a wing-type toggle bolt.

4. A conduit for carrying high temperature fluid under pressure, comprising:
 (a) a cylindrical inner core;
 (b) a cylindrical layer of insulation material located concentrically around said inner core;
 (c) a cylindrical outer casing located concentrically around said layer of insulation material, said outer casing including an opening extending entirely therethrough; and
 (d) means located in said outer casing for passing moisture within said layer of insulation material and under a predetermined amount of pressure to the ambient surroundings of said conduit, along a predetermined path through said opening, said means preventing fluid in said ambient surroundings from passing into said layer of insulation material along said path, said means including a resilient body member located within and extending through said opening, said body member including an outwardly extending circumferential fin located in said opening movable between
  (i) first biased position in the absence of said moisture under pressure in said layer of insulation material for completely closing said opening; and,
  (ii) a second position in the presence of said moisture under pressure for opening said path to said fluid under pressure.

5. A conduit according to claim 4 wherein said means includes a wing-type toggle bolt for holding said body member in place in said opening, said bolt including a longitudinal threaded shaft extending through said body member and having one end section located in said layer of insulation material, and a wing element threaded around said end section and spanning said opening against the underside of said casing.

6. A conduit according to claim 5 wherein said predetermined pressure is at least 1–5 psi.

* * * * *

UNITED STATES PATENT AND TRADEMARK OFFICE
CERTIFICATE OF CORRECTION

PATENT NO. : 4,130,140

DATED : December 19, 1978

INVENTOR(S) : Ronald N. Cerny, Walter B. Peters, Thomas H. Sadler, Peter Rodrigo and George M. Mollick It is certified that error appears in the above-identified patent and that said Letters Patent are hereby corrected as shown below:

Column 3, line 17, delete "application"

Column 3, line 22, delete "application"

Column 3, line 28, delete "application"

Column 3, line 32, delete "application"

Column 5, line 18, Claim 1, following "under" insert --pressure--.

Signed and Sealed this

Twenty-ninth Day of May 1979

[SEAL]

Attest:

RUTH C. MASON
Attesting Officer

DONALD W. BANNER
Commissioner of Patents and Trademarks